US012729336B2

(12) United States Patent
Shepherd et al.

(10) Patent No.: US 12,729,336 B2
(45) Date of Patent: Sep. 8, 2026

(54) BIODEGRADABLE AND ACID SOLUBLE MATERIALS FOR CONTROL OF LOSS OF CIRCULATION IN RESERVOIR DRILLING OPERATIONS

(71) Applicant: Baker Hughes Oilfield Operations LLC, Houston, TX (US)

(72) Inventors: Autumn Shepherd, Katy, TX (US); Dorianne A. Castillo, Humble, TX (US); April Shi, Katy, TX (US); Hunter Wright, Katy, TX (US)

( * ) Notice: Subject to any disclaimer, the term of this patent is extended or adjusted under 35 U.S.C. 154(b) by 0 days.

(21) Appl. No.: 18/655,645

(22) Filed: May 6, 2024

(65) Prior Publication Data

US 2024/0384153 A1 Nov. 21, 2024

Related U.S. Application Data

(60) Provisional application No. 63/467,181, filed on May 17, 2023.

(51) Int. Cl.
*C09K 8/487* (2006.01)
*E21B 21/00* (2006.01)

(52) U.S. Cl.
CPC ............ *C09K 8/487* (2013.01); *E21B 21/003* (2013.01); *C09K 2208/08* (2013.01)

(58) Field of Classification Search
None
See application file for complete search history.

(56) References Cited

U.S. PATENT DOCUMENTS

| | | | | |
|---|---|---|---|---|
| 6,790,812 | B2 | 9/2004 | Halliday et al. | |
| 7,081,439 | B2 | 7/2006 | Sullivan et al. | |
| 7,279,446 | B2 | 10/2007 | Colaco et al. | |
| 7,482,311 | B2 | 1/2009 | Willberg et al. | |
| 2003/0195120 | A1 * | 10/2003 | Halliday ................. | C09K 8/16 507/140 |

(Continued)

FOREIGN PATENT DOCUMENTS

| | | | |
|---|---|---|---|
| WO | 2014008190 | A1 | 1/2014 |
| WO | 2017138913 | A1 | 8/2017 |
| WO | 2020246964 | A1 | 12/2020 |

OTHER PUBLICATIONS

International Search Report and Written Opinion for International Application No. PCT/US2024/027954; International Filing Date May 6, 2024; Report Mail Date Aug. 26, 2024; 9 pages.

(Continued)

*Primary Examiner* — Andrew Sue-Ako
(74) *Attorney, Agent, or Firm* — Baker Hughes Company

(57) ABSTRACT

A lost circulation pill for a drilling or completion operation includes, based on a total weight of the lost circulation pill, about 0.1 to about 2 weight percent of a luffa component comprising at least one of a luffa fiber or luffa sponge; about 10 to about 30 weight percent of at least one of a sized carbonate or a sized degradable synthetic material, in the form of particles, flakes, fibers, or a combination thereof; and about 60 to about 90 weight percent of a brine. A method of controlling lost circulation in a lost circulation zone in a wellbore includes introducing the lost circulation pill in the wellbore as described hereinabove, and forming a plug from the lost circulation pill in the lost circulation zone.

15 Claims, 3 Drawing Sheets

(56) References Cited

U.S. PATENT DOCUMENTS

| | | | | |
|---|---|---|---|---|
| 2006/0237192 | A1* | 10/2006 | Shaarpour | E21B 21/003 507/104 |
| 2008/0139417 | A1 | 6/2008 | Alsyed et al. | |
| 2010/0004146 | A1* | 1/2010 | Panga | C09K 8/70 507/212 |
| 2010/0298175 | A1* | 11/2010 | Ghassemzadeh | C09K 8/516 507/124 |
| 2013/0306317 | A1 | 11/2013 | Karadkar et al. | |
| 2014/0038857 | A1* | 2/2014 | Miller | C09K 8/035 507/104 |
| 2014/0360728 | A1 | 12/2014 | Tashiro et al. | |
| 2015/0300131 | A1 | 10/2015 | Vigderman et al. | |
| 2015/0330197 | A1 | 11/2015 | Brannon et al. | |
| 2016/0102244 | A1 | 4/2016 | Takahashi et al. | |
| 2016/0333247 | A1* | 11/2016 | Whitfill | C09K 8/516 |
| 2017/0166795 | A1* | 6/2017 | Walker | C09K 8/502 |
| 2019/0048248 | A1 | 2/2019 | Pearl, Jr. et al. | |
| 2020/0131421 | A1 | 4/2020 | Hall et al. | |
| 2021/0108493 | A1 | 4/2021 | Ye et al. | |
| 2021/0246756 | A1 | 8/2021 | Kobayashi | |
| 2023/0323182 | A1* | 10/2023 | Deville | C04B 28/18 507/104 |

OTHER PUBLICATIONS

Rostami, Ameneh "Development of Self-Destructing Filter Cake;" Submitted to the Office of Graduate Studies of Texas A&M University; Aug. 2010; 135 pages.

Teixeira, Stefanie et al., "Towards Controlled Degradation of Poly(lactic) Acid in Technical Applications;" Journal of Carbon Research, Apr. 30, 2021; 43 pages.

* cited by examiner

BIODEGRADABLE AND ACID SOLUBLE MATERIALS FOR CONTROL OF LOSS OF CIRCULATION IN RESERVOIR DRILLING OPERATIONS

CROSS REFERENCE TO RELATED APPLICATIONS

This application claims the benefit of an earlier filing date from U.S. Provisional Application Ser. No. 63/467,181 filed May 17, 2023, the entire disclosure of which is incorporated herein by reference.

BACKGROUND

Loss of circulation is the uncontrolled flow of a fluid into a formation. It can be encountered during any stage of well operations. Loss of circulation can result in increased cost of the well through increased material costs to replace the lost fluids, and the downtime to remediate the lost circulation zones.

Lost circulation zones may be remediated by introducing a lost circulation material (LCM) to seal off the lost circulation zone to prevent further fluid loss. Conventional LCMs can include bridging materials, fibrous materials, flaky materials, cements, and other materials having different particle sizes. While these materials may be effective at mediating many lost circulation zones, most of these LCMs are not readily degradable. Thus, there is a continuing need for new lost LCMs that are biodegradable.

SUMMARY

A lost circulation pill for a drilling or completion operation comprises, based on a total weight of the lost circulation pill, about 0.1 to about 2 weight percent of a luffa component comprising at least one of a luffa fiber or luffa sponge; about 10 to about 30 weight percent of at least one of a sized carbonate or a sized degradable synthetic material, in the form of particles, flakes, fibers, or a combination thereof; and about 60 to about 90 weight percent of a brine.

A method of controlling lost circulation in a lost circulation zone in a wellbore comprises introducing a lost circulation pill as described herein above in the wellbore, and forming a plug from the lost circulation pill in the lost circulation zone.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
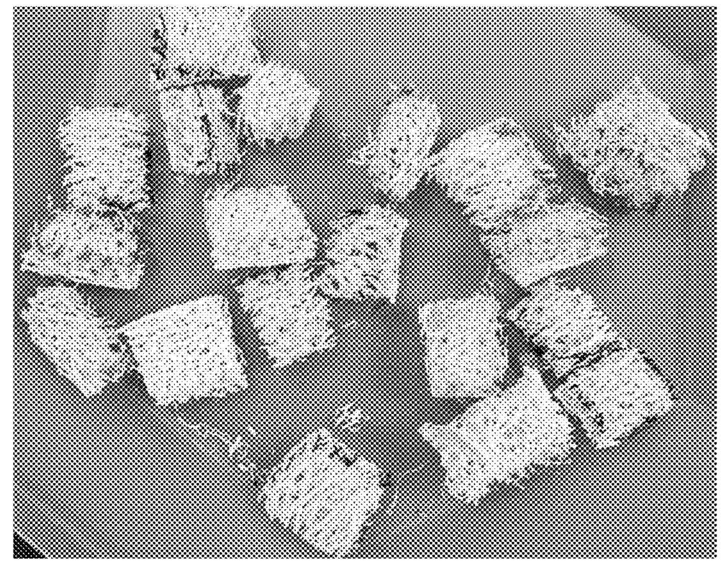
FIG. 1 shows an example of luffa that can be used in the lost circulation pill, where the luffa is square shaped and has a dimension of approximately 9.5 mm by 10 mm.

The inventors have discovered a lost circulation pill that is biodegradable and/or acid soluble. The lost circulation pill comprises a luffa component comprising at least one of a luffa fiber or luffa sponge; at least one of a sized carbonate or a sized synthetic degradable material, in the form of particles, flakes, fibers, or a combination thereof; and a brine. The dissolution of the lost circulation pill can be adjusted based on the temperature and operational time, using water, acid or filter cake breakers.

The luffa component can be present in an amount of about 0.1 to about 2 weight percent based on a total weight of the lost circulation pill. A width of the luffa component can be about 0.5 to about 10 millimeters, preferably about 1 to about 8 millimeters, and a length of the luffa component can be about 12 to about 20 millimeters, preferably about 8 to about 10 millimeters or about 10 to about 25 millimeters.

The luffa component comprises at least one of a luffa fiber or luffa sponge. The luffa sponge can be a *Luffa aegyptiaca* sponge, or a *Luffa acutangula* sponge, or a combination thereof. The *Luffa aegyptiaca* sponge and the *Luffa acutangula* sponge are cut in pieces to have the width and length as described herein for the luffa component. As used herein, the luffa fiber is not a single filament like glass fiber, but rather a bundle of cellulose fibrils making a fibrous vascular system in a hierarchical structure.

The lost circulation pill comprises about 10 to about 30 weight percent of at least one of a sized carbonate or a sized synthetic degradable material, in the form of particles, flakes, fibers, or a combination thereof.

The sized carbonate can include at least one of sized calcium carbonate, or sized magnesium carbonate. The sized carbonate can comprise carbonate with different particle size distributions (PDS). For example the sized carbonate can include at least one of: first carbonate particles having a D50 of about 1100 to about 1200 microns, second carbonate particles having a D50 of about 600 to 700 microns, third carbonate particles having a D50 of about 200 to 300 microns, or fourth carbonate particles having a D50 of about 10 to 30 microns.

In an embodiment, the sized carbonate comprises about 10 to about 20 weight percent of carbonate particles having a D50 of about 1100 to about 1200 microns, or about 1135 microns; about 5 to about 15 weight percent of the carbonate particles having a D50 of about 600 to about 700 microns, or about 658 microns; about 5 to about 15 weight percent of the carbonate particles having a D50 of about 200 to about 300 microns, or about 224 microns, each based on a total weight of the sized carbonate. As used herein, D50 refers to a median diameter measured by a laser particle size distribution analyzer. The sized carbonate can also comprise particles and flakes.

The sized synthetic degradable material can comprise at least one of polyglycolic acid (PGA), poly-3-hydroxybutyrate-co-3-hydroxyhexanoate, polylactic acid (PLA), phthalic acid, phthalic anhydride, or a copolymer thereof. The sized synthetic degradable material can include particles having a D50 of about 277 microns to about 1.5 millimeters.

In an embodiment, the lost circulation pill comprises both the sized carbonate and the sized degradable synthetic material, and the weight ratio of the sized carbonate relative to the sized degradable synthetic material can be about 2:98 to about 94:6, preferably about 10:90 to about 30:70.

The lost circulation pill contains about 60 to about 90 weight percent of a brine. The brine can include unsaturated up to saturated Ca, Na, K, Cs, or Zn halides or formate brine. Examples of the salts suitable for use in creating the brine include, sodium chloride, potassium chloride, calcium chloride, sodium bromide, calcium bromide, zinc bromide, sodium formate, potassium formate, cesium formate, or a combination comprising two or more of the foregoing salts. The density of the brine may range from about 8.4 pounds/gallon (lb/gal or ppg) to about 17 lb/gal (about 1 to about 2 kg/liter), preferably about 11 lb/gal to about 14 lb/gal.

The lost circulation pill can optionally include about 0.1 to about 10 weight percent or about 1 to about 10 weight percent of a degradable viscosifier based on the total weight of the lost circulation pill. Examples of the degradable viscosifier includes at least one of xanthan gum, polysaccharide, a viscoelastic surfactant, hydroxylethyl cellulose or a diallyldimethylammonium chloride.

The viscoelastic surfactant is usually ionic. It may be cationic, anionic or zwitterionic depending on the charge of its head group. When the surfactant is cationic, it is associated with a negative counterion, which can be an inorganic anion such as a sulfate, a nitrate, a perchlorate or a halide such as Cl, Br or with an aromatic organic anion such as salicylate, naphthalene sulfonate, p and m chlorobenzoates, 3,5 and 3,4 and 2,4-dichlorobenzoates, t-butyl and ethyl phenate, 2,6 and 2,5-dichlorophenates, 2,4,5-trichlorophenate, 2,3,5,6-tetrachlorophenate, p-methyl phenate, m-chlorophenate, 3,5,6-trichloropicolinate, 4-amino-3,5,6-trichlorpicolinate, 2,4-dichlorophenoxyacetate. When the surfactant is anionic, it is associated with a positive counterion, for example, Na+ or K+. When it is zwitternionic, it is associated with both negative and positive counterions, for example, Cl and Na+ or K+. Other viscoelastic surfactant has been described in U.S. Pat. Nos. 7,081,439 and 7,279,446.

Optionally the lost circulation pill can also include an acid dissolvable mineral fiber. Examples of the mineral fiber include a fiber formed from at least one of $SiO_2$, $Al_2O_3$, CaO, MgO, or $Fe_2O_3$. Commercially available miner fiber includes MAGMA™ fiber. If present, the mineral fiber can be used in an amount of about 1 to about 10 weight percent or about 2 to about 5 weight percent, based on the total weight of the lost circulation pill.

The lost circulation pill can be used to control lost circulation in a lost circulation zone in a wellbore. The method includes introducing a lost circulation pill in the wellbore, and forming a plug from the lost circulation pill in the lost circulation zone.

When no longer needed, the plug formed from the lost circulation pill can be removed during completion operations such as an acidizing job. The plug can also be removed using a filter cake breaker. If PLA is used, the breakdown of the PLA will produce poly lactic acid, which in itself can act as an acidizing component.

EXAMPLES

Figure 2:
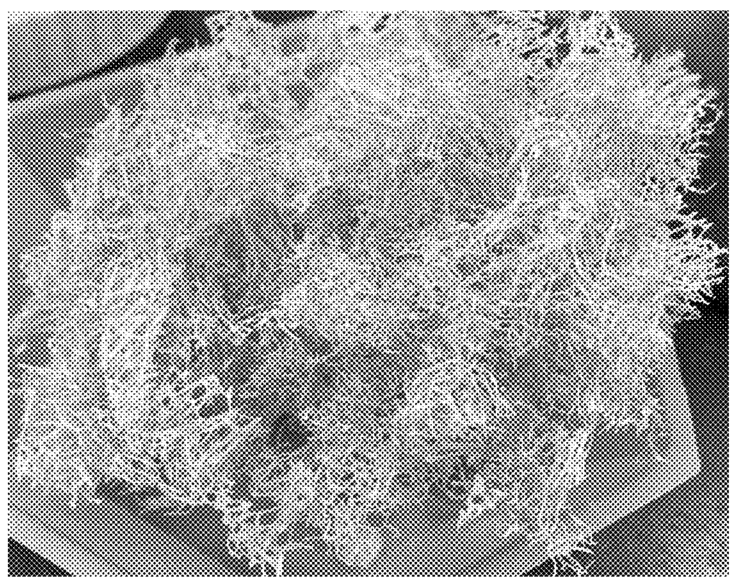
FIG. 2 shows another example of luffa that can be used in the lost circulation pill, where the luffa is shredded (also referred to as "loose luffa")
Figure 3:
FIG. 3 shows the side profile of a slotted disk (8 mm) which has been sealed with a plug formed from a lost circulation pill as described herein.
Figure 4:
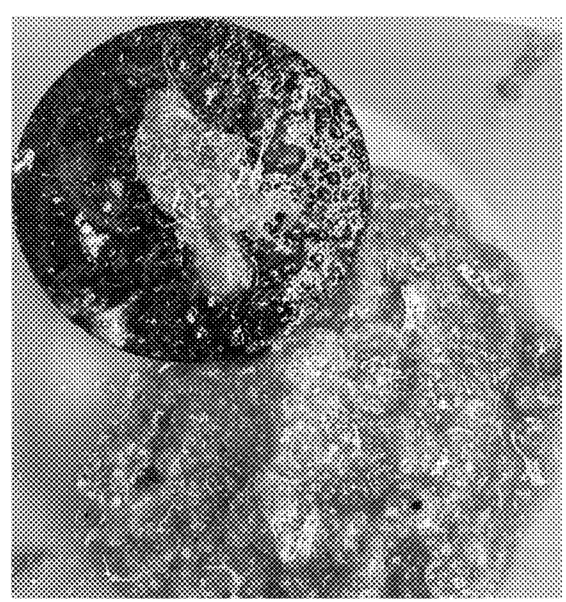
FIG. 4 is a top view of the slotted disc of FIG. 3, which has been sealed with a plug formed from a lost circulation pill as described herein.
Figure 5:
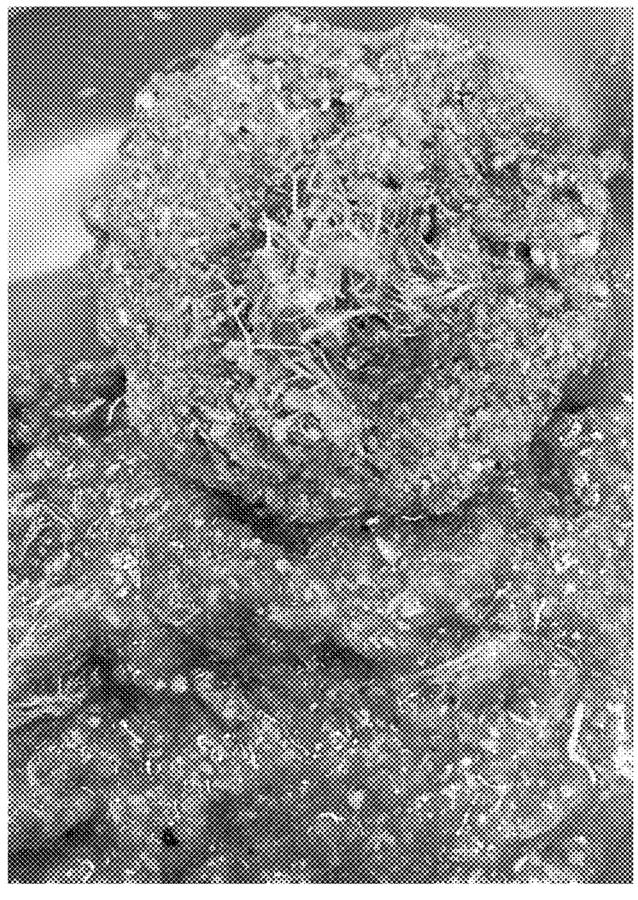
FIG. 5 shows the plug in FIG. 3 after it was removed from the slotted disk.
Figure 6:
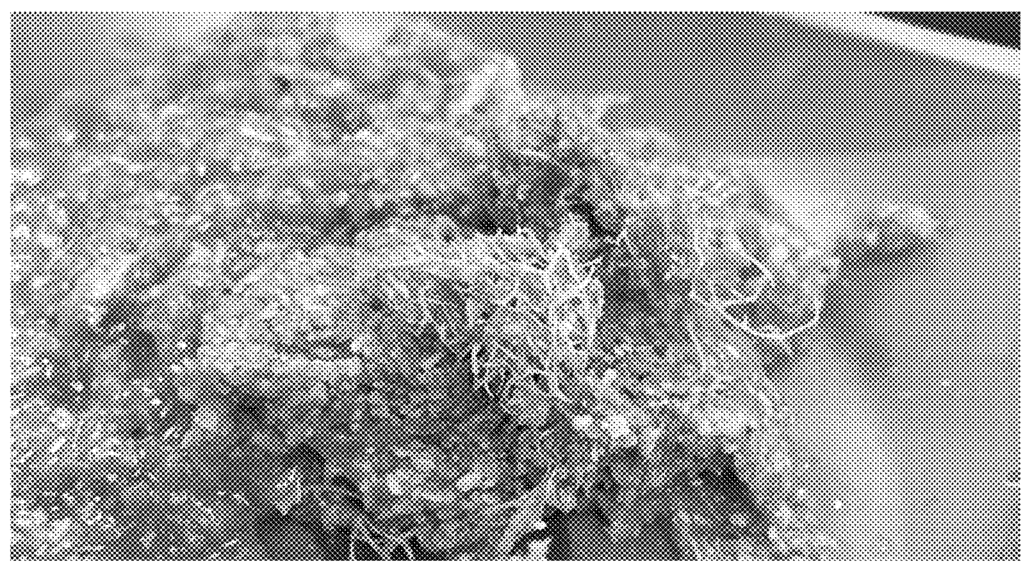
FIG. 6 is a cross-sectional view of the plug of FIG. 5.

Two types of luffa were used for the examples, one had a square shape with dimensions of approximately 9.5 mm by 10 mm as shown in FIG. 1, and the other was shredded luffa with random cuts as shown in FIG. 2. Compositions of Ex 1 to Ex 4 were made by combining the components as shown in Table 1 and Table 2. Each of the compositions of Ex 1 to Ex 4 was individually taken into a 500 ml cell with the slot on top the fluid. The cell was placed in a permeability plugging apparatus, and pressure was slowly applied until it reached 500 psi. The pressure pushed the piston up against the tested composition through the slotted liner until it plugged. After 500 psi, the receiver was opened, and the tested composition was allowed to form a plug along the slotted liner. The test was continued for 30 minutes to ensure that the seal was held under pressure. Thirty minutes later, the fluid loss was measured showing how much the tested composition could be lost to the formation. The results are shown in Tables 1 and 2 as well as FIGS. 3-6. The data shows that lost circulation pill containing luffa can seal against a slotted liner under pressure.

TABLE 1

| Components | Unit | Ex 1 | Ex 2 | Ex 3 |
|---|---|---|---|---|
| 11.6 ppg $CaCl_2$ brine | bbl | 0.622 | 0.544 | 0.739 |
| Water | bbl | 0.211 | 0.291 | 0.074 |
| Viscosifier | ppb | 8.00 | 8.00 | 8.00 |
| Viscosifier additive | ppb | 2.00 | 2.00 | 2.00 |
| $CaCO_3$ PSD 800-1000 μm | ppb | 18.00 | 18.00 | 18.00 |
| PLA PSD 700-200 μm | ppb | 11.00 | 11.00 | 11.00 |
| $CaCO_3$ PSD 20 μm | ppb | 6.00 | 6.00 | 6.00 |
| Magma fiber mineral fiber | ppb | 30.00 | 30.00 | 30.00 |
| $CaCO_3$ PSD 700 μm | ppb | 42.00 | 42.00 | 42.00 |
| PLA PSD 1500 μm | ppb | 10.00 | — | 40.00 |
| $CaCO_3$ flake PSD 2000 μm | ppb | — | 20.00 | — |
| Luffa | ppb | — | 1.00 (FIG. 1) | 1.00 (FIG. 2) |
| | | 3 mm slot | 5 mm slot | 8 mm slot |
| Fluid loss before seal was formed | ml | 58 | 50 | 150 |
| Filtercake | | yes | yes | yes |
| Received plugged | | no | no | no |
| Pressure held | | yes | yes | yes |
| Observations | | plugged | plugged | plugged |

TABLE 2

| Components | Unit | Ex 4 |
|---|---|---|
| 11.6 ppg $CaCl_2$ brine | bbl | 0.739 |
| Water | bbl | 0.074 |
| Viscosifier | ppb | 8.00 |
| Viscosifier additive | ppb | 2.00 |
| $CaCO_3$ PSD 800-1000 μm | ppb | 18.00 |
| $CaCO_3$ PSD 680-20 μm | ppb | 30.00 |
| Magma fiber mineral fiber | ppb | 30.00 |
| $CaCO_3$ PSD 700 μm | ppb | 42.00 |
| $CaCO_3$ flake PSD 2000 μm | ppb | 40.00 |
| Luffa | ppb | 1 (loose luffa) |
| | | 8 mm slot |
| Fluid loss before seal was formed | ml | 130 |
| Filtercake | | yes |
| Received plugged | | no |
| Pressure held | | yes |
| Observations | | plugged |

Set forth below are various embodiments of the disclosure.

Aspect 1. A lost circulation pill for a drilling or completion operation comprising, based on a total weight of the lost circulation pill, about 0.1 to about 2 weight percent of a luffa component comprising at least one of a luffa fiber or luffa sponge; about 10 to about 30 weight percent of at least one of a sized carbonate or a sized degradable synthetic material, in the form of particles, flakes, fibers, or a combination thereof; and about 60 to about 90 weight percent of a brine.

Aspect 2. The lost circulation pill as in any prior aspect, wherein the luffa component has a width of about 0.5 millimeter to about 10 millimeters, and a length of about 12 millimeter to about 50 millimeters.

Aspect 3. The lost circulation pill as in any prior aspect, wherein the luffa component is a *Luffa aegyptiaca* sponge or a *Luffa acutangular* sponge.

Aspect 4. The lost circulation pill as in any prior aspect, comprising the sized degradable synthetic material, and the sized degradable synthetic material comprises at least one of polyglycolic acid, a copolymer of poly-3-hydroxybutyrate-co-3-hydroxyhexanoate, or polylactic acid, phthalic acid, or phthalic anhydride.

Aspect 5. The lost circulation pill as in any prior aspect, comprising the sized carbonate, and the sized carbonate comprises at least one of calcium carbonate or magnesium carbonate.

Aspect 6. The lost circulation pill as in any prior aspect, wherein the lost circulation pill comprises the sized carbonate and the sized degradable synthetic material.

Aspect 7. The lost circulation pill of as in any prior aspect, wherein a weight ratio of the sized carbonate relative to the sized degradable synthetic material is about 2:98 to about 6:94.

Aspect 8. The lost circulation pill as in any prior aspect, further comprising about 0.1 to about 10 weight percent of a degradable viscosifier based on the total weight of the lost circulation pill.

Aspect 9. The lost circulation pill as in any prior aspect, wherein the degradable viscosifier comprises at least one of xanthan gum, polysaccharide, a viscoelastic surfactant, hydroxylethyl cellulose or a diallyldimethylammonium chloride.

Aspect 10. The lost circulation pill as in any prior aspect, further comprising an acid dissolvable mineral fiber.

Aspect 11. A method of controlling lost circulation in a lost circulation zone in a wellbore, the method comprising: introducing a lost circulation pill in the wellbore, and forming a plug from the lost circulation pill in the lost circulation zone, the lost circulation pill comprising, based on a total weight of the lost circulation pill, about 0.1 to about 2 weight percent of a luffa component comprising at least one of a luffa fiber or luffa sponge; about 10 to about 30 weight percent of at least one of a sized carbonate or a sized degradable synthetic material, in the form of particles, flakes, fibers, or a combination thereof; and about 60 to about 90 weight percent of a brine.

Aspect 12. The method as in any prior aspect, wherein the luffa component has a width of about 0.5 millimeter to about 10 millimeters, and a length of about 12 millimeter to about 50 millimeters.

Aspect 13. The method as in any prior aspect, wherein the luffa component is a *Luffa aegyptiaca* sponge or a *Luffa acutangular* sponge.

Aspect 14. The method as in any prior aspect, the lost circulation pill comprises the sized degradable synthetic material, and the sized degradable synthetic material comprises at least one of polyglycolic acid, a copolymer of poly-3-hydroxybutyrate-co-3-hydroxyhexanoate, or polylactic acid, phthalic acid, or phthalic anhydride.

Aspect 15. The method as in any prior aspect, wherein lost circulation pill comprises the sized carbonate, and the sized carbonate comprises at least one of calcium carbonate or magnesium carbonate.

Aspect 16. The method as in any prior aspect, wherein the lost circulation pill comprises the sized carbonate and the sized degradable synthetic material.

Aspect 17. The method as in any prior aspect, wherein a weight ratio of the sized carbonate relative to the sized degradable synthetic material is about 2:98 to about 6:94.

Aspect 18. The method as in any prior aspect, wherein the lost circulation pill further comprises about 0.1 to about 10 weight percent of a degradable viscosifier based on the total weight of the lost circulation pill.

Aspect 19. The method as in any prior aspect, wherein the degradable viscosifier comprises at least one of xanthan gum, polysaccharide, a viscoelastic surfactant, hydroxylethyl cellulose or a diallyldimethylammonium chloride.

Aspect 20. The method as in any prior aspect, wherein the lost circulation pill further comprises an acid dissolvable mineral fiber.

All ranges disclosed herein are inclusive of the endpoints, and the endpoints are independently combinable with each other. As used herein, "combination" is inclusive of blends, mixtures, alloys, reaction products, and the like. All references are incorporated herein by reference in their entirety.

The use of the terms "a" and "an" and "the" and similar referents in the context of describing the invention (especially in the context of the following claims) are to be construed to cover both the singular and the plural, unless otherwise indicated herein or clearly contradicted by context. The terms "about", "substantially" and "generally" are intended to include the degree of error associated with measurement of the particular quantity based upon the equipment available at the time of filing the application. For example, "about" and/or "substantially" and/or "generally" can include a range of ±8% of a given value. As used herein, the size or average size of the particles refers to the largest dimension of the particles and can be determined by high resolution electron or atomic force microscope technology.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A lost circulation pill for a drilling or completion operation comprising, based on a total weight of the lost circulation pill, about 0.1 to about 2 weight percent of a luffa component comprising at least one of a luffa fiber or luffa sponge;

about 10 to about 30 weight percent of a combination of a sized carbonate and a sized degradable synthetic material in a ratio of 10:90 to 30:70, in the form of particles, flakes, fibers, or a combination thereof;

about 0.1 to about 10 weight percent of a degradable viscosifier based on the total weight of the lost circulation pill, wherein the degradable viscosifier comprises at least one of xanthan gum, polysaccharide, a viscoelastic surfactant, hydroxyethyl cellulose or a diallyldimethylammonium chloride; and about 60 to about 90 weight percent of a brine;

wherein the sized carbonate comprises:

first carbonate particles having a D50 of about 1100 to about 1200 microns, present in an amount of about 10 to about 20 weight percent based on the total weight of the sized carbonate;

second carbonate particles having a D50 of about 600 to about 700 microns, present in an amount of about S to about 15 weight percent based on the total weight of the sized carbonate:

third carbonate particles having a D50 of about 200 to about 300 microns, present in an amount of about 5 to about 15 weight percent based on the total weight of the sized carbonate; and optionally, fourth carbonate particles having a D50 of about 10 to about 30 microns.

2. The lost circulation pill of claim 1, wherein the luffa component has a width of about 0.5 millimeter to about 10 millimeters, and a length of about 12 millimeter to about 50 millimeters.

3. The lost circulation pill of claim 1, wherein the luffa component is a *Luffa aegyptiaca* sponge or a *Luffa acutangular* sponge.

4. The lost circulation pill of claim 1, comprising the sized degradable synthetic material, and the sized degradable synthetic material comprises at least one of polyglycolic acid, a copolymer of poly-3-hydroxybutyrate-co-3-hydroxyhexanoate, polylactic acid, phthalic acid, or phthalic anhydride.

5. The lost circulation pill of claim 1, comprising the sized carbonate, and the sized carbonate comprises at least one of calcium carbonate or magnesium carbonate.

6. The lost circulation pill of claim 1, wherein the lost circulation pill comprises the sized carbonate and the sized degradable synthetic material.

7. The lost circulation pill of claim 1, further comprising an acid dissolvable mineral fiber.

8. The lost circulation pill according to claim 1, wherein the sized carbonate further comprises fourth carbonate particles having a D50 of about 10 to about 30 microns.

9. A method of controlling lost circulation in a lost circulation zone in a wellbore, the method comprising:

introducing a lost circulation pill in the wellbore, and forming a plug from the lost circulation pill in the lost circulation zone, the lost circulation pill comprising, based on a total weight of the lost circulation pill, about 0.1 to about 2 weight percent of a luffa component comprising at least one of a luffa fiber or luffa sponge;

about 10 to about 30 weight percent of a combination of a sized carbonate and a sized degradable synthetic material in a ratio of 10:90 to 30:70, in the form of particles, flakes, fibers, or a combination thereof;

about 0.1 to about 10 weight percent of a degradable viscosifier based on the total weight of the lost circulation pill, wherein the degradable viscosifier comprises at least one of xanthan gum, polysaccharide, a viscoelastic surfactant, hydroxyethyl cellulose or a diallyldimethylammonium chloride; and about 60 to about 90 weight percent of a brine;

wherein the sized carbonate comprises:

first carbonate particles having a D50 of about 1100 to about 1200 microns, present in an amount of about 10 to about 20 weight percent based on the total weight of the sized carbonate;

second carbonate particles having a D50 of about 600 to about 700 microns, present in an amount of about S to about 15 weight percent based on the total weight of the sized carbonate;

third carbonate particles having a D50 of about 200 to about 300 microns, present in an amount of about 5 to about 15 weight percent based on the total weight of the sized carbonate; and optionally, fourth carbonate particles having a D50 of about 10 to about 30 microns.

10. The method of claim 9, wherein the luffa component has a width of about 0.5 millimeter to about 10 millimeters, and a length of about 12 millimeter to about 50 millimeters.

11. The method of claim 9, wherein the luffa component is a *Luffa aegyptiaca* sponge or a *Luffa acutangular* sponge.

12. The method of claim 9, the lost circulation pill comprises the sized degradable synthetic material, and the sized degradable synthetic material comprises at least one of polyglycolic acid, a copolymer of poly-3-hydroxybutyrate-co-3-hydroxyhexanoate, polylactic acid, phthalic acid, or phthalic anhydride.

13. The method of claim 9, wherein lost circulation pill comprises the sized carbonate, and the sized carbonate comprises at least one of calcium carbonate or magnesium carbonate.

14. The method of claim 9, wherein the lost circulation pill comprises the sized carbonate and the sized degradable synthetic material.

15. The method of claim 9, wherein the lost circulation pill further comprises an acid dissolvable mineral fiber.

* * * * *